March 16, 1965  O. FREGEOLLE  3,173,277
KNITTING APPARATUS
Filed Feb. 1, 1960  8 Sheets-Sheet 1
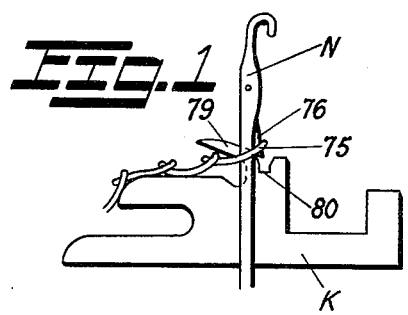
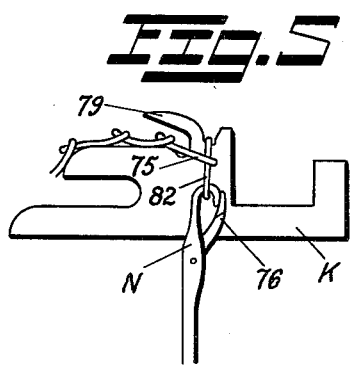
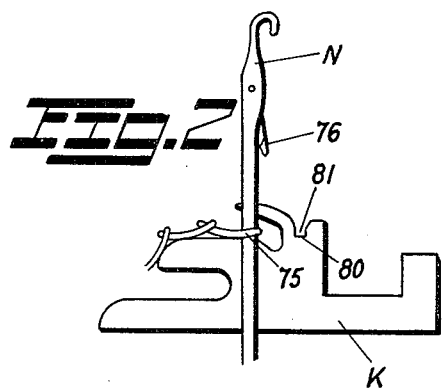
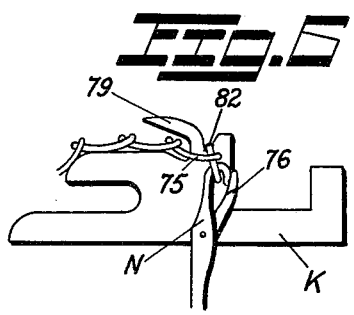
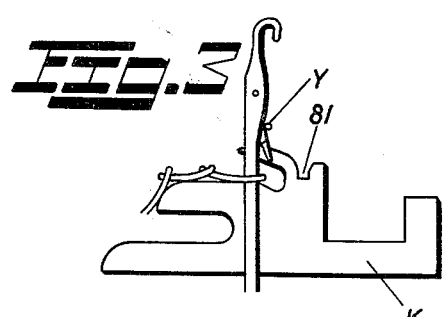
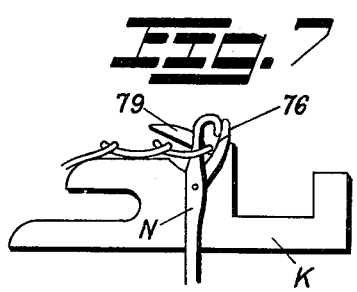
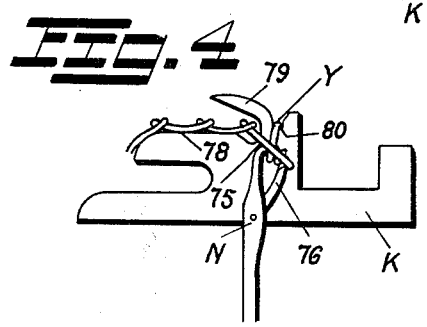
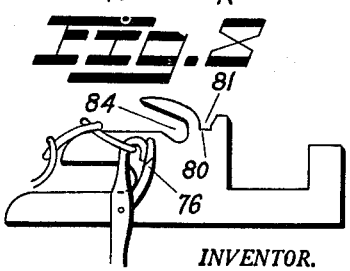
INVENTOR.
OSCAR FREGEOLLE
BY
Rodney C. Sautherworth
ATTORNEY March 16, 1965

O. FREGEOLLE 3,173,277

KNITTING APPARATUS

Filed Feb. 1, 1960

INVENTOR.
OSCAR FREGEOLLE.
BY
Rodney C. Southworth
ATTORNEY

INVENTOR
OSCAR FREGEOLLE.
BY
Rodney C. Southworth
ATTORNEY.

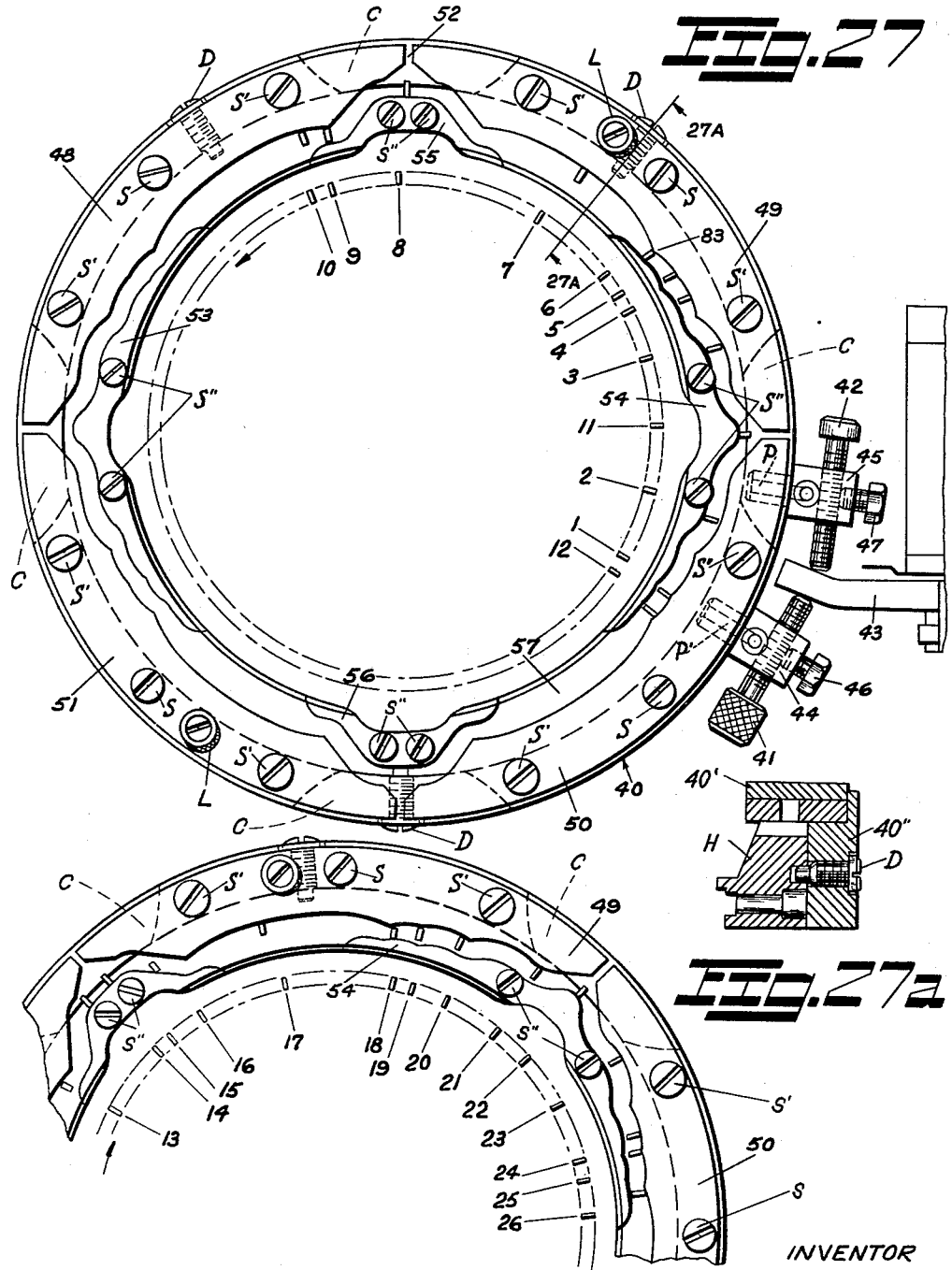

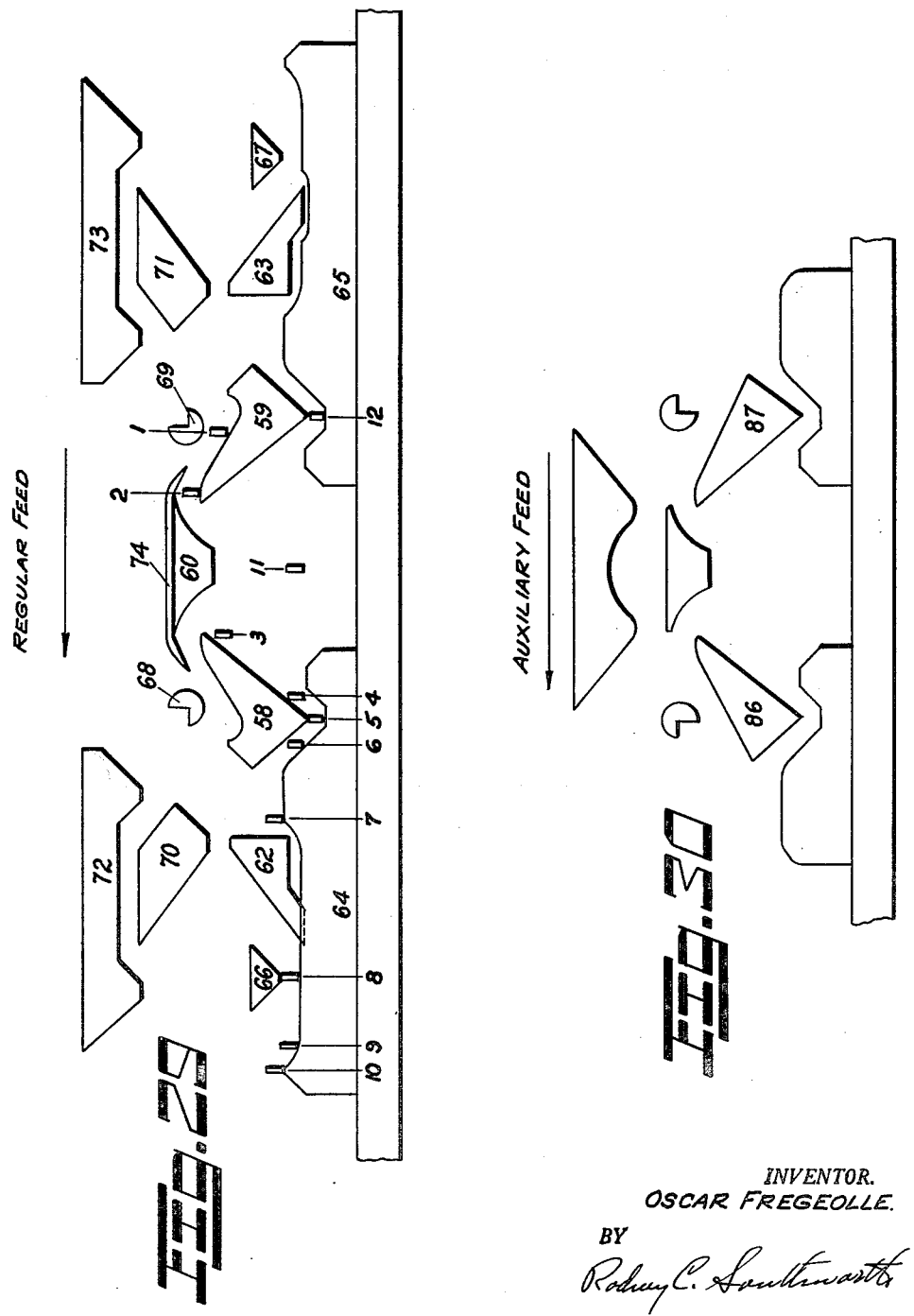

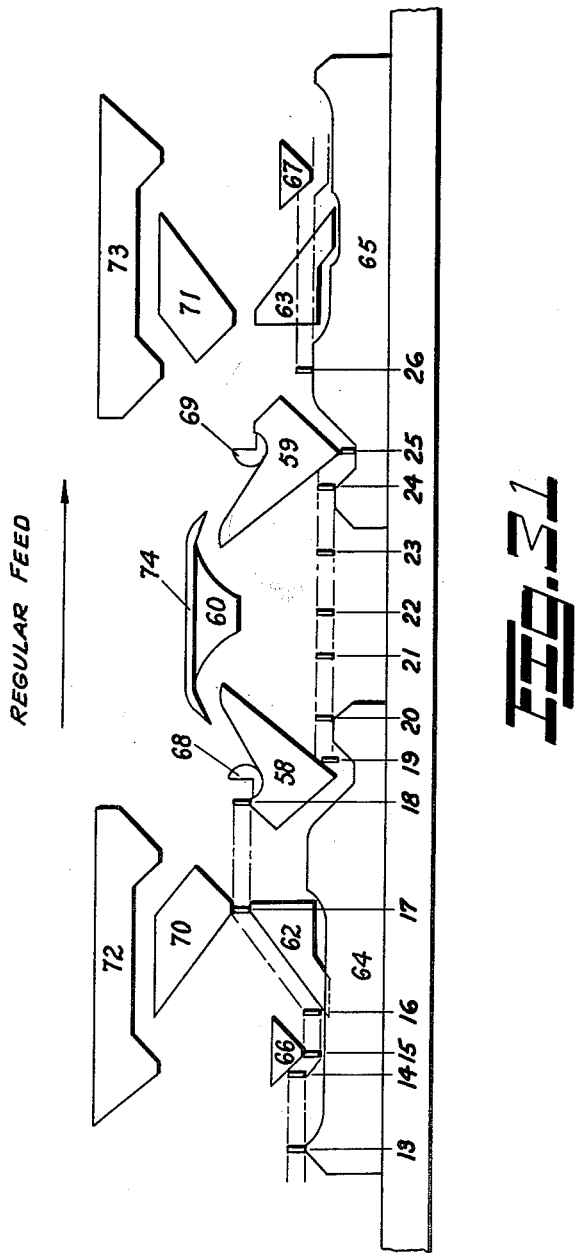

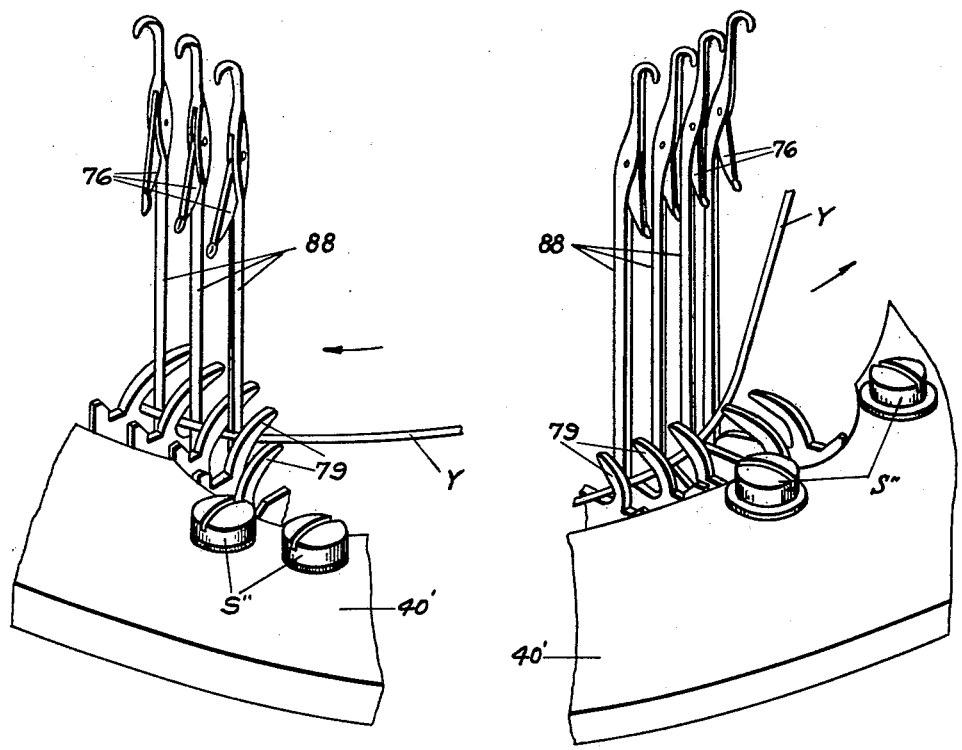
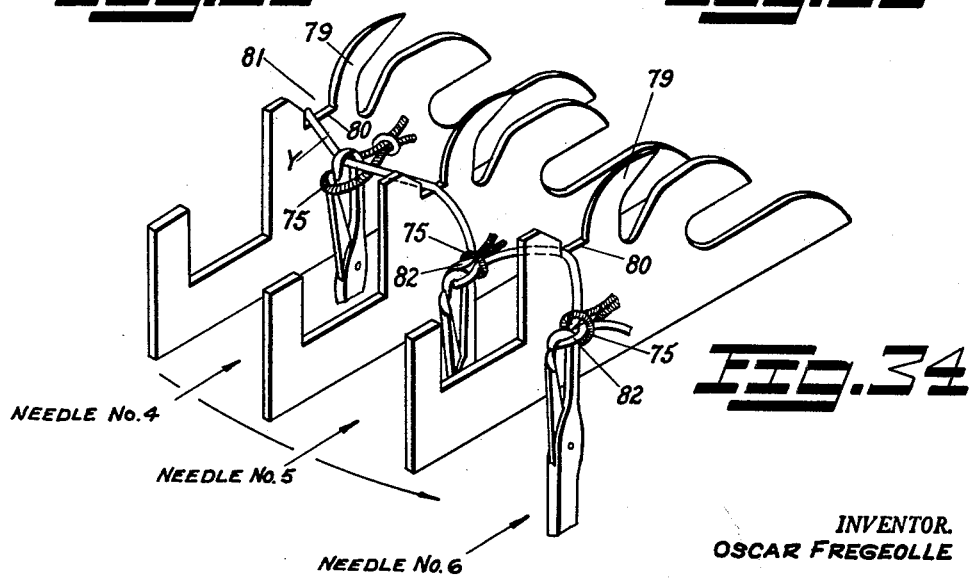

March 16, 1965   O. FREGEOLLE   3,173,277
KNITTING APPARATUS
Filed Feb. 1, 1960   8 Sheets-Sheet 8
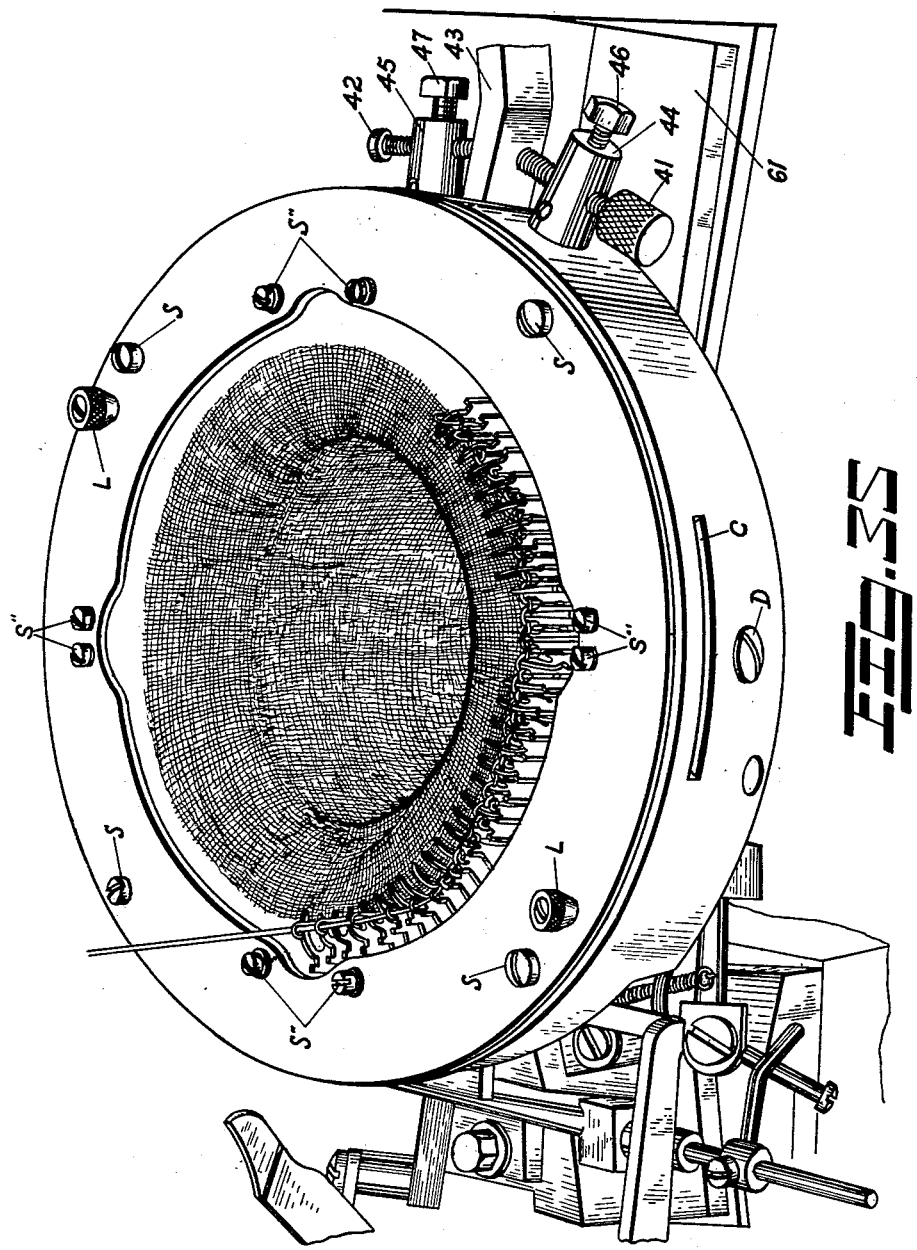
INVENTOR.
OSCAR FREGEOLLE.
BY
Rodney C. Southworth
ATTORNEY

United States Patent Office 3,173,277
Patented Mar. 16, 1965

3,173,277
KNITTING APPARATUS
Oscar Fregeolle, Lincoln, R.I., assignor to Draper Corporation, Hopedale, Mass., a corporation of Maine
Filed Feb. 1, 1960, Ser. No. 5,789
5 Claims. (Cl. 66—107)

This invention relates to a novel knitting method and apparatus therefor, and, in particular, to the knitting of fabrics having a greatly improved appearance over those heretofore known.

It is the general object of the invention to provide a new method of knitting which has particular application to the production of solid color fabrics and also to related types of knitting such as plating and reverse plating, which method results in a stocking wherein the loops of each course and wale are more uniform in appearance and which is free of "dog-ears" and holes at the ends of the gore, and to an apparatus for producing such a stocking.

It is a more specific object to provide a method of knitting fabrics wherein the knitting takes place behind the nibs and over the backs of sinkers after which newly formed sinker loops are passed from the backs over the tops of the nibs and into depressions in the throats of the sinkers in which those loops are relieved when the needles adjacent such sinkers pass through the knitting track at a subsequent knitting station without knitting thereat.

It is a more particular object of the invention to devise a method and mechanism by which stitches drawn at a particular knitting cycle may be "redrawn" or the instrumentalities which draw those stitches may be repeatedly passed through knitting stations without elongating, stretching, straining or distorting those stitches in any appreciable degree so that patterns requiring such reworking of the stitch, known as "hold patterns," may be advantageously knitted.

It is a further object to provide a knitting machine of the circular, independent needle, multiple feed type which is adapted for both circular and reciprocatory knitting of solid color fabrics, especially hosiery, and which has been modified so that knitting takes place over the backs of sinkers and in which, unlike previous machines of this type, the sinker cap as well as the cam blocks at each knitting station and the sinker and needle cams are all substantially fixed in position.

It is a further object to provide mechanism to eliminate the strain on previously formed stitches when inactive needles pass through the knitting track at a subsequent knitting station and without knitting thereat.

It is a further object to provide a sinker cap in which sinker butts work on hardened steel cams at all times and which is free of overlapping joints and which is self-clearing of lint.

It is a further object to reduce substantially the number of parts associated with the sinker cap and to simplify the construction and assembly thereof.

United States Patent No. 2,217,022 discloses a knitting machine of the type to which this invention may be applied and which is especially suited for the production of solid color hosiery wherein patterned areas as well as the heel and toe are knitted by reciprocation of the knitting instrumentalities, and other parts such as the ring top, ring toe and loopers rounds are knitted as circular work during which the machine is rotated continuously in one direction. In the device of the patent during reciprocatory work the knitting cylinder oscillates nearly two complete revolutions so that the needles go through the cam blocks twice at each stroke, inactive needles remaining in the knitting track except in the heel and toe when some of the needles are raised to an extreme position by narrowing picks and raise cams. Reciprocation of the cylinder when knitting in a conventional manner under the nibs of sinkers produces uneven and non-uniform loops, and the gores in the heel and toe usually have eyelets or holes and "dog-ears" at their ends. Retention of inactive needles in the knitting track while passing through cam blocks resulted in a straining of previously formed loops as needles were drawn under stitch cams at knitting stations where they do not knit and where those loops were retained at the same level on the sinker at which the yarn was measured when the loops were formed.

According to the structure of that patent separate cams and control means are required to move both the main and auxiliary cam blocks inwardly and outwardly of the knitting cylinder so that the stitch cams mounted thereon may affect only long butt needles when knitting the heel and toe of a stocking, for example, which is done with long butt needles only, the short butt needles retaining instep loops and passing idly through the knitting path under stitch cams and without knitting. Control means are also required to retain the main center cam in place against the needle cylinder when the main cam block is withdrawn and a slot and tongue arrangement is provided to permit a sliding action between the center cam and cam block at that time.

Knitting behind the nibs and over the backs of sinkers is not novel and such a method has been disclosed in United States Patents 2,374,532 and 2,374,857 and is of particular advantage in the knitting of finer gauge fabrics such as ladies' seamless hosiery. The use of that method has been found to eliminate the so-called "washboard effect" wherein loops in adjacent courses tilt in opposite directions when knitting in reciprocation, as well as eliminating streaks and non-uniform loops. Knitting over the backs of sinkers solved the problem of robbing of yarn from newly drawn loops which took place in the casting off process and the passing of sinker loops from the backs of the sinkers over the tops of their nibs and into their throats equalized the amount of yarn on either side of both the needle and sinker loops so that they become straighter and more uniform in other respects.

The present invention is a still further improvement over the conventional method of knitting on the fronts of sinkers and in the throats thereof and has been particularly directed for application in the manufacture of solid color hosiery on circular, independent needle, multiple feed knitting machines of the type wherein solid color patterns in the foot and leg portion of a stocking, as well as the heel and toe, are normally knit in reciprocation. Other portions are formed by circular or rotary knitting. It is to be understood, however, that the invention is not to be limited to the production of solid color hosiery, but that it has application as well to wrap patterns and split foot hosiery and to body fabrics of practically all types where it is desired to produce an improved reciprocatorily knitted product.

The invention will be described with respect to its application on a solid color hoisery machine of the type disclosed in United States Patent No. 2,217,022 and as such it represents an improvement over such a machine in many respects. The sinker cap is no longer oscillatable as in the patent and it is retained in position by a pair of opposed adjustable set screws bearing against the yarn lever box instead of on the carrier ring post. Both the main and auxiliary cam blocks and the center and stitch cams remain fixed in against the cylinder at all times. Such a construction eliminates the need for control mechanisms for introducing and withdrawing the cam blocks at the proper times and prevents the possibility of needle butts becoming jammed against the sides of the stitch cams due to play in the cam block setting. Self-clearing slots maintain the cap free of lint at all times.

Sinker cams are of novel construction which eliminate overlapping joints and which present a continuous hardened steel surface against which sinker butts work at all times.

The sinkers are provided with a yarn measuring surface at a fixed level behind the nibs thereof which is slightly higher than the fabric supporting surface in front of the nibs. In order to relieve the strain on previously formed loops which have been cast off over the nibs and into the throats and which loops are retained by needles which pass through the knitting track but without knitting as is often the case, a depression has been provided in the deepest portion of the throats into which those loops are drawn at those times. The depth of the depression is substantially below the surface at the backs of the nibs over which the yarn for those loops was measured.

Further objects and advantages will be apparent from the description to follow.

In the drawings,

FIGS. 1 to 12 are representative of significant needle and sinker positions relative to each other and illustrate the manner of loop formation in a counterclockwise direction of rotation of the needle cylinder;

FIG. 27 is a plan view of the sinker cam layout locating the sinker and needle positions which correspond to those of FIGS. 1 to 12 and wherein the top of the sinker cap is assumed to be transparent;

FIG. 27a is a sectional view of FIG. 27 taken on line 27a—27a;

FIG. 28 is a view similar to FIG. 27 locating sinker and needle positions corresponding to those of FIGS. 13 to 26;

FIG. 29 is a diagrammatic view showing needle cams adjacent the main or regular feeding station with needle butt positions 1 to 12 located thereon and the narrowing picks thereat;

FIG. 30 is a similar view of the auxiliary feeding station and the widening picks thereat;

FIG. 31 is a diagrammatic view similar to that of FIG. 29 and locating needle butt positions 13 to 26 with respect to needle cams at the main feed;

FIGS. 32 and 33 show, respectively, the manner in which yarn is trapped under nibs of sinkers by raised needles when knitting in the heel or toe, and the subsequent release thereof in the opposite direction of rotation as sinkers are withdrawn at the feeding station;

FIG. 34 is a perspective view illustrating the formation of a stitch according to the invention; and FIG. 35 is a perspective view of the top of the needle cylinder and its associated mechanism illustrating the new method of knitting.

Figure 9:
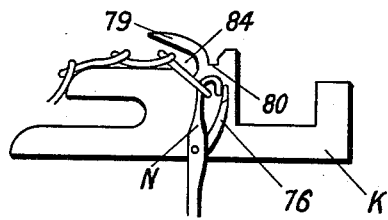
Figure 13:
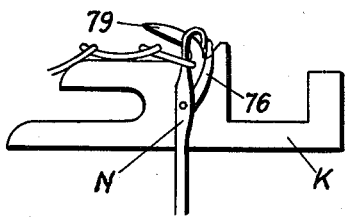
FIGS. 13 to 26 are views similar to FIGS. 1 to 12 and illustrate relative positions of sinkers and needles and loop formation in a clockwise direction of rotation.

The invention will be described with respect to its application on the well-known S.C.P. or S.C.O.P. machines manufactured by the Hemphill Company and which are circular, two feed, independent needle knitting machines of the type disclosed in United States Patent No. 2,217,022 for knitting solid color hosiery but it also may be applied to a four feed machine or to other than solid color knitting. Parts of the mechanism of that patent which have no particular bearing on the present invention have not been shown and will not be described since reference to the patent will afford a complete description of such parts.

The knitting machine as disclosed in that patent is a two feed circular, independent needle one adapted to knit solid color work such as the well-known argyle stockings comprising diamond shaped areas of various colors. The pattern areas, heel and toe are normally knit in reciprocation and the remainder of the stocking preferably in circular work. A regular or main feeding station (not shown) is located on the right side of the machine and an auxiliary feeding station (also not shown) is diametrically opposed thereto.

Now referring to FIGS. 1 to 12, 27 and 29, a portion of the knitting cycle will be described as the knitting cylinder and needles rotate in a counterclockwise direction, assuming that the machine is in reciprocatory work in the pattern area of a stocking. The sinker cap is generally indicated by the arrow 40 (FIG. 27) and is of two-piece construction including a top portion 40' and a side portion 40" which are held together by four set screws S which extend downwardly through the top of the cap. The cap is fixed in a stationary position by means of adjustable oppositely directed set screws 41 and 42 which abut opposite sides of a plate 43 which is fastened to the yarn lever box (not shown) at the right hand side of the machine. The set screws are threaded in members 44 and 45 affixed to the outer circumference of the sinker cap in any suitable manner, and lock screws 46 and 47 maintain any given setting. Oil passageways P are provided in members 44 and 45 to permit lubrication of the cap. Symmetrical, hardened steel sinker cams 48, 49, 50 and 51 are mounted each by a pair of set screws S' to the side portion 40" of the sinker cap as noted in FIGS. 27 and 28 and are slightly spaced from each other as at 52 so that there are no overlapping joints as in previous constructions to interfere with smooth operation of the sinker butts. A further pair of hardened steel sinker cams 53 and 54 identical in shape, are centrally located at the auxiliary and main feeding stations, respectively, in diametrically opposed relation and are adapted to withdraw sinkers to an extreme position at the midpoint thereof and to move said sinkers inwardly in separate increments at either side thereof as will later be explained. A still further pair of cams 55 and 56 are located intermediate the feeding stations and withdraw sinkers outwardly to cast off loops from the backs of sinkers in a manner and for reasons later to be described. Cams 53, 54, 55 and 56 are fastened to the top portion 40' of the sinker cap by means of set screws S". The cap maintains its vertical relationship with the sinker head H by means of three full dog screws D which extend into a groove about the outer circumference of the sinker head and which are set in the side portion of the cap as noted in FIGS. 27 and 27a. Such a construction permits an increased lateral bearing area between sinker head and cap, thereby providing more stability between the two. A pair of lifting members L fixed to the top 40' facilitate its removal from the remainder of the cap. The cap is self-clearing of lint due to the provision of clearing slots C at points spaced around the cap. Sinker butts are withdrawn outwardly in those areas to force lint into the slots. Note sinker butt at position 11 in FIG. 27.

The numbers 1 to 12 located within the confines of the sinker cap in FIG. 27 represent selectively chosen needle positions which are representative of the action at the other needles during the formation of a loop over the backs of sinkers and its subsequent casting off over the nibs as the needle cylinder is moving in a counterclockwise direction. The butts of corresponding co-acting sinkers are shown, immediately following each needle and in the sinker butt cam path 57.

In FIGS. 29 and 30 needle cams and picks at the regular and auxiliary feeds, respectively, are diagrammatically illustrated. The needle cam layout is substantially the same as that disclosed in United States Patent No. 2,217,022 with slight modifications and adjacent the regular feed station includes stitch cams 58 and 59 and a center cam 60 fixedly mounted on a cam block 61 which itself is fixed to a plate member (not shown). In this respect these stitch cams and the center cam differ from the patented structure in which they were retractible away from the cylinder. Needle raise cams 62 at the back and 63 at the front of the machine are movable toward and away from the knitting cylinder in a known manner to raise some or all of the needles to be affected by the stitch cams and to form stitches. Guard cams 64 and 65 are of conventional design and serve the usual purpose. Needle draw down cams 66 and 67 lower needles immediately after casting off lops from the backs of sinkers so that those loops may be taken into the throats of the sinkers as the latter are brought inwardly again before reaching the knitting station. Narrowing picks 68 and 69 come into operation when knitting in the heel or toe.

Draw down cams 70 and 71 and guard cams 72 and 73 along with the wing cam 74 located on top of the center cam are utilized when knitting a new type of toe which is formed by narrowing only, but since the method by which such a toe is produced forms no part of the present invention, it need not be further described here. A conventional type toe may be knitted by utilizing only the remaining cams and those at the auxiliary feed which form the normal complement of the usual S.C.P. or S.C.O.P. machine.

The numbers 1 to 12 in FIG. 29 locate certain needle butt positions with respect to the needle cams and these correspond to the similarly numbered needle but positions located in FIG. 27 with respect to the sinker cap and sinker cams. By combining the data available from both of FIGS. 27 and 29 it becomes possible to illustrate the exact vertical positions of the needles and the radial positions of sinkers, and this is what has been done with these same twelve positions in FIGS. 1 to 12 on enlarged scale, at the same time indicating thereon in proper relationship a few loops of yarn.

FIG. 9 shows a needle N and a sinker K following at position 1 in FIGS. 27 and 29 at which time the needle is being elevated by the stitch cam 59, the previously formed loop 75 still encompassing the latch 76 of the needle while the sinker itself is being drawn outwardly of the cylinder.

In FIG. 2 the needle is at the top of stitch cam 59, the latch has been released and the sinker is still further out.

In FIG. 3 the new yarn Y is about to be taken by the hook 77 of the needle. Between positions 2 and 3 the sinker has been withdrawn outwardly to an extreme position for a reason later to be explained. The needle has been lowered slightly by the center cam 60 and is about to be affected by the stitch cam 58 to form a new loop.

FIG. 4 shows the top of the needle as being very slightly below the fabric level 78 just prior to the complete formation of the new loop as the old loop 75 is about to be cast off. The sinker has proceeded still further inwardly and the yarn Y now lies behind the nib 79 and at a fixed level forming the bottom 80 of a notch 81 which constitutes the measuring surface for the yarn.

In FIG. 5 the needle is at the lowermost point of the stitch cam 58 and a new loop 82 has been formed, the old one now having been cast off, and the proper amount of yarn is drawn over the measuring surface of the sinker which is now in a position above the hook of the needle.

In FIG. 6 the top of the needle is again at a point just below the fabric level as in FIG. 4 as the needle is being elevated by the guard cam 64. In order to prevent the needle from passing up through the old loop 75 thereby to result in two loops being contained in the needle hook when the next new loop is formed, the sinker is moved inwardly by the cam 49 to the point 83 (FIG. 27) which is its innermost point of travel in the knitting cycle. In the knitting of "hold" patterns in the conventional manner, because the stitches were stretched and sinkers held out just after the stitch cams were passed, there was a tendency to drop stitches off of needles. The new method avoids this possibility by avoiding stretching of formed loops and also by moving the sinkers inwardly to point 83 (FIG. 27) so that the throats thereof push against the fabric thereby holding these loops in the hooks of their needles.

FIG. 34 perspectively illustrates needle and sinker positions 4, 5 and 6 on a larger scale, more clearly demonstrating the manner in which a loop is formed over the backs and behind the nibs of sinkers.

Figure 10:
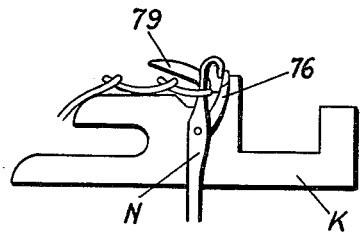
Figure 14:
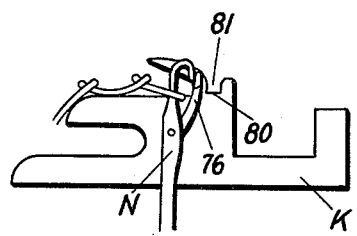

Between positions 7 and 8 in FIG. 27 the sinker has been withdrawn outwardly by the cam 55 in order to permit the newly formed sinker loop 82 to be transferred up over the nib 79 as shown in FIGS. 7 and 8 after which the sinker is affected by the cam 48 to bring the fabric into the throat 84 of the sinker, illustrated in FIGS. 9 and 10.

Of course, not all of the needles are selected to knit consecutively, depending upon the particular pattern requirements. Positions 11 and 12 and the similarly numbered figures of drawing have been selected to indicate what transpires with respect to those needles which pass through the cam blocks without knitting, this being a frequent occurrence in this type of machine wherein the needle cylinder rotates almost two complete revolutions in each direction during reciprocatory knitting, one course of fabric being formed in each direction.

As previously formed loops were redrawn through the cam blocks in the device of the above-cited patent, those loops were located on the same surface on the sinker from which the yarn was measured when those loops were formed. As a result, as the needle would pass under the stitch points of cams 58 and 59, those loops were redrawn or reworked and stretched to a substantial degree. This stretching of loops has become a limiting factor in patterning so that a "hold" pattern could be successfully knitted only when it has been limited to few idle strokes.

Figure 11:
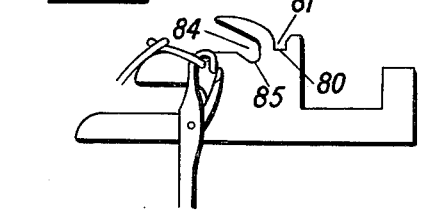
Figure 15:
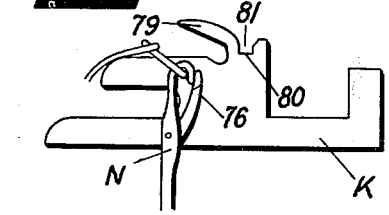
Figure 12:
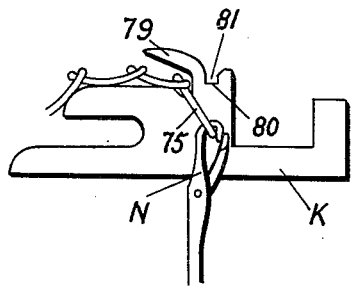
Figure 16:
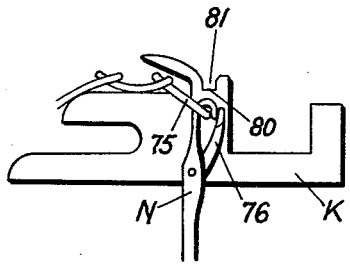
Figure 17:
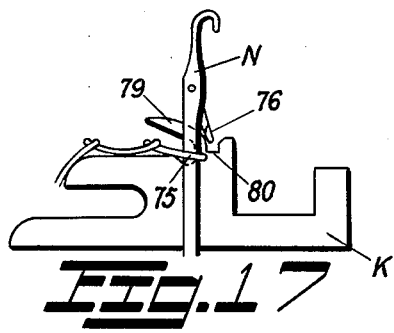
Figures 21, 23:
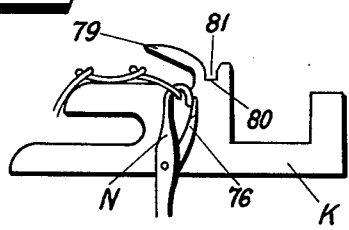
Figure 18:
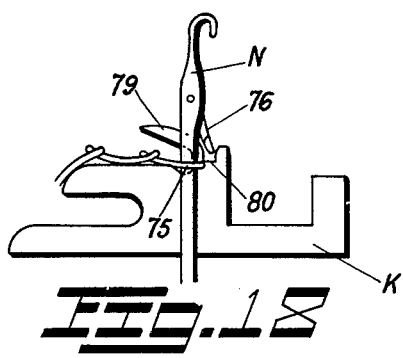
Figure 22:
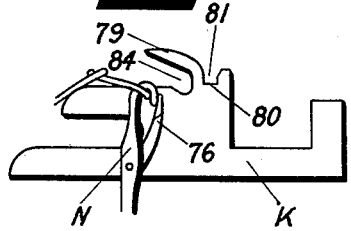
Figure 19:
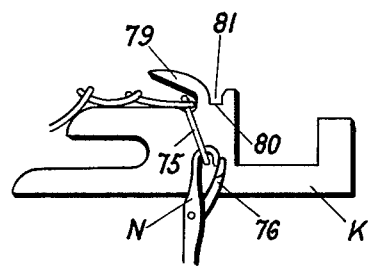
Figure 25:
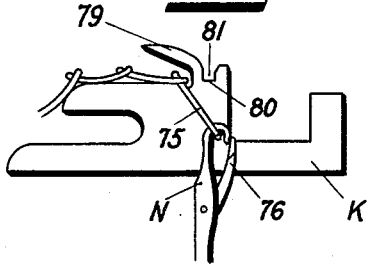
Figures 20, 24:
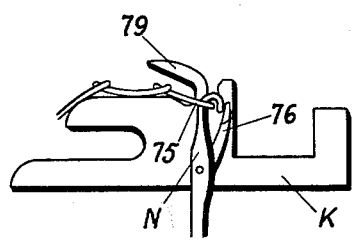
Figure 26:
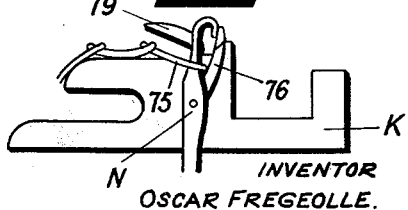

One of the important features of this invention relates to the elimination of any such stretching. This is accomplished by providing in addition to the drawing over the backs of nibs as described depressions or undercuts in the deepest portion of the sinker throats in which previously formed loops may be relieved as needles carrying them pass inactively through the knitting station. This is shown in FIGS. 11 and 12. At position 12 the needle butt is at the stitch point of cam 59, it being noted that the cylinder is rotating in a counterclockwise direction, that needle passing inactively through the cam block since it was not selected to knit. The sinkers have all been provided with depressions 85 in the deepest portion of the throats thereof and in which the previously formed loop 75 is relieved at such times. The lowermost part of the depression should be about .042 inch below the measuring edge 80. That loop is again relieved in the depression as the needle is again lowered to the stitch point of cam 58.

This relief of previously formed loops also takes place at the auxiliary knitting station as machine needles pass under stitch cams 86 and 87 thereat (FIG. 30).

FIGURES 13 to 26, 28 and 31 are representative of needle and sinker positions when knitting in a clockwise direction of rotation during reciprocatory knitting. FIGURES 13 to 18 and the similarly numbered positions in FIGS. 28 and 31 show those needle and sinker positions wherein needles have been selected to knit at the regular feeding station while FIGS. 19 to 26 illustrate positions corresponding to inactive needles which have not been selected to knit but which merely draw previously formed loops through the cam block and relieving them in the depressions in the throats of the sinkers, all in a manner similar to that described above with respect to counterclockwise direction of rotation. Note that FIG. 12, for example, which corresponds to inactive needle position 12 at the lowermost point of a stitch cam in one direction of rotation is similar to FIG. 25 which corresponds to the same position in the opposite direction of rotation.

When knitting in the heel or toe of a stocking, which is done in reciprocatory work on such a machine, certain needles are elevated by picks to an inactive position to permit narrowing to take place. Due to the fact that sinkers are withdrawn outwardly away from the knitting cylinder at points intermediate the feeding stations by means of cams 55 and 56, the yarn becomes trapped under the nibs in the throats of the sinkers by these raised needles and would not be in proper position to be taken by needles which are to knit when the rotation of the cylinder is reversed. For this reason the yarn must be released from the throats of sinkers as the sinkers approach the knitting station.

FIG. 32 is a perspective view of the knitting instrumentalities as they pass in front of the machine just after sinkers have been withdrawn outwardly by cam 56 and as they are moving inwardly again under the influence of cam 51, while the cylinder is rotating in a clockwise direction. Yarn Y from the main feeding station becomes trapped at that time between raised needles 88 and the nibs 79 of the inwardly moving sinkers. If not released the yarn would remain trapped as the cylinder rotated in the opposite direction and the yarn would extend from the yarn fingers at an improper angle to be taken by needles which are to knit. To correct this situation the sinker cam 54 is designed so that sinkers are withdrawn as the feeding station is approached. The latter is illustrated in FIG. 33 which is a view of the instrumentalities adjacent the main feeding station. Of course, the same problem exists with respect to cam 55 when the cylinder is rotating in the opposite direction and is overcome similarly. Likewise, when yarn is being fed from the auxiliary station, the cam 53 releases the trapped yarn in a similar manner.

FIG. 35 illustrates in a perspective manner the formation of loops over the backs of sinkers at the auxiliary knitting station as the needle cylinder is moving in a counterclockwise direction and further shows these loops being cast off over the nibs of sinkers at the front of the machine.

While the invention has been described with particular reference to a patterned fabric wherein patterned areas are knitting in reciprocation, it is to be understood that the invention has equal application where such areas are knitted entirely by straightaway or rotary knitting. For example, certain patterns may be so knitted on a two or four feed machine where one or more yarns are fed to be knitted on spaced needles at one feeding station and one or more additional yarns are fed to be knitted by the intermediate needles at a second feeding station. All those needles which knit at any given station must hold their previously formed loops as they pass under the stitch cams at every other knitting station. According to the present invention where these previously formed loops are knitted over the backs of nibs of sinkers and then cast over the nibs and into depressions in the sinker throats, the loops are uniform and are not strained as needles pass inactively through the cam blocks.

Similar advantages will result where two or more yarns are fed to the same needles to be knitted simultaneously such as in plating wherein a plating yarn is superimposed upon a body yarn beneath it, and additionally where a wrap yarn is incorporated to make wrap patterns, wherein these take place at two or more feeding stations and some of the needles pass inactively through at least one of the stations.

While one embodiment of the invention has been disclosed, it is to be understood that the inventive concept may be carried out in a number of ways. This invention is, therefore, not to be limited to the precise details described, but is intended to embrace all variations and modifications thereof falling within the spirit of the invention and the scope of the claims.

I claim:

1. In a circular, independent needle knitting machine, a reciprocable needle cylinder, first and second yarn feeding stations on opposite sides of said cylinder, knitting cam means on either side of each feeding station, one each of said cam means at either feeding station being adapted to function in one direction of rotation of said cylinder and the other in the opposite direction, said needle cylinder further being reciprocable to an extent to cause all of the needles to pass through a given feeding station at least twice in a single stroke, a center sinker cam at each feeding station adapted to withdraw sinkers to an extreme position at the mid-point thereof and to move said sinkers inwardly in separate increments at either side thereof, and further sinker cams in opposed relation to each other located substantially equidistantly between said center cams and adapted to withdraw sinkers to said extreme position.

2. The structure of claim 1 which includes a sinker cap, and clearing slots in said cap whereby sinker butts automatically force accumulated lint into said slots.

3. In a circular, independent needle, knitting machine having needles, a sinker head and sinkers mounted therein, multiple knitting stations through which said needles are adapted to pass in reciprocation, a center sinker cam at each said knitting station adapted to control said sinkers so that knitting takes place over the backs of nibs thereof, and a further sinker cam on each side of each knitting station adapted to transfer sinker loops from the backs of sinker nibs into the throats under the nibs thereof, each of said center sinker cams including a plurality of points of varying depths on each side of the midpoint thereof for affecting sinkers, said further sinker cams in opposed relation to each other located substantially equidistantly between said center cams and adapted to withdraw sinkers to substantially the same maximum extent as said center sinker cams.

4. In a circular, independent needle, knitting machine having needles, a sinker head and sinkers mounted therein, multiple knitting stations through which said needles are adapted to pass in reciprocation, a center sinker cam at each said knitting station adapted to control said sinkers so that knitting takes place over the backs of nibs thereof, and a further sinker cam on each side of each knitting station adapted to transfer sinker loops from the backs of sinker nibs into the throats under the nibs thereof, each of said center sinker cams including a plurality of points of varying depths on each side of the midpoint thereof for affecting sinkers, said further sinker cams in opposed relation to each other located substantially equidistantly between said center cams and adapted to withdraw sinkers to substantially the same maximum extent as said center sinker cams, a sinker cap overlying said sinker head, and clearing slots in said cap whereby sinker butts automatically force accumulated lint into said slots.

5. In a circular, independent needle, knitting machine having needles, a sinker head and sinkers mounted therein, multiple knitting stations through which said needles are adapted to pass in reciprocation, a center sinker cam at each said knitting station adapted to control said sinkers so that knitting takes place over the backs of nibs thereof, and a further sinker cam on each side of each knitting station adapted to transfer sinker loops from the backs of sinker nibs into the throats under the nibs thereof, each of said center sinker cams including a pluraltiy of points of varying depths on each side of the midpoint thereof for affecting sinkers, said further sinker cams in opposed relation to each other located substantially equidistantly between said center cams and adapted to withdraw sinkers to substantially the same maximum extent as said center sinker cams, a fixed sinker cap overlying said sinker head, and clearing slots in said cap whereby sinker butts automatically force accumulated lint into said slots.

References Cited in the file of this patent

UNITED STATES PATENTS

| | | |
|---|---|---|
| 1,616,530 | Hinchliff | Feb. 8, 1927 |
| 2,080,377 | Nebel | May 11, 1937 |
| 2,178,911 | Lawson | Nov. 7, 1939 |
| 2,381,275 | Green et al. | Aug. 7, 1945 |
| 2,401,083 | Koppel | May 28, 1946 |
| 2,427,720 | Fregeolle | Sept. 23, 1947 |
| 2,576,962 | McDonough | Dec. 4, 1951 |
| 2,711,090 | Marlette | June 21, 1955 |
| 2,966,782 | Deiss et al. | Jan. 3, 1961 |
| 3,040,548 | Levin | June 26, 1962 |